US011946750B2

(12) United States Patent
Giorgio et al.

(10) Patent No.: US 11,946,750 B2
(45) Date of Patent: Apr. 2, 2024

(54) METHOD FOR VEHICLE ENVIRONMENT MAPPING, CORRESPONDING SYSTEM, VEHICLE AND COMPUTER PROGRAM PRODUCT

(71) Applicant: Marelli Europe S.p.A., Corbetta (IT)

(72) Inventors: Giuseppe Giorgio, Corbetta (IT); Axel Furlan, Corbetta (IT); Lauro Snidaro, Udine (IT); Lubos Vaci, Udine (IT)

(73) Assignee: Marelli Europe S.p.A., Corbetta (IT)

( * ) Notice: Subject to any disclaimer, the term of this patent is extended or adjusted under 35 U.S.C. 154(b) by 642 days.

(21) Appl. No.: 17/253,028

(22) PCT Filed: Jun. 19, 2019

(86) PCT No.: PCT/IB2019/055145
§ 371 (c)(1),
(2) Date: Dec. 16, 2020

(87) PCT Pub. No.: WO2019/244060
PCT Pub. Date: Dec. 26, 2019

(65) Prior Publication Data
US 2021/0131823 A1 May 6, 2021

(30) Foreign Application Priority Data
Jun. 22, 2018 (IT) .................... 102018000006594

(51) Int. Cl.
*G01C 21/34* (2006.01)
*G01C 21/00* (2006.01)
(Continued)

(52) U.S. Cl.
CPC ..... *G01C 21/3407* (2013.01); *G01C 21/3848* (2020.08); *G01C 21/3881* (2020.08);
(Continued)

(58) Field of Classification Search
CPC ............ G01C 21/3407; G01C 21/3848; G01C 21/3881; G01S 17/86; G01S 17/89;
(Continued)

(56) References Cited

U.S. PATENT DOCUMENTS

2015/0154471 A1   6/2015   Ruan et al.
2017/0197311 A1   7/2017   Garcia et al.

FOREIGN PATENT DOCUMENTS

DE   102014200279 A1 *  7/2015   ............ B60W 30/08
JP   2012033193 A       2/2012
(Continued)

OTHER PUBLICATIONS

C. Seeger, M. Manz, P. Matters and J. Hornegger, "Locally adaptive discounting in multi sensor occupancy grid fusion," 2016 IEEE Intelligent Vehicles Symposium (IV), Gothenburg, Sweden, 2016, pp. 266-271, doi: 10.1109/IVS.2016.7535396. (Year: 2016).*
(Continued)

Primary Examiner — Anne Marie Antonucci
Assistant Examiner — Jodi Marie Jones
(74) Attorney, Agent, or Firm — Howard & Howard Attorneys PLLC

(57) ABSTRACT

A method for vehicle (V) environment mapping, comprising the operations of: receiving a set of input values from a plurality of sensors, applying temporal fusion processing to the set of input values, resulting in a respective set of occupancy grid maps, applying data fusion processing to the set of occupancy grid maps, resulting in at least one fused occupancy grid map, detecting discrepancies by comparing occupancy grid maps in the set of maps, resulting in a set of detected discrepancies, processing the at least one fused occupancy grid map and outputting a fused occupancy grid map of drivable spaces. The processing operation includes the step of performing an arbitration of conflict in the at least
(Continued)

one fused occupancy grid map. The compound fused occupancy grid map of drivable spaces is supplied (IA) to a user circuit, such as a drive assistance interface.

15 Claims, 7 Drawing Sheets

(51) Int. Cl.
| | | |
|---|---|---|
| *G01S 17/86* | (2020.01) | |
| *G01S 17/89* | (2020.01) | |
| *G01S 17/931* | (2020.01) | |
| *G05D 1/00* | (2006.01) | |
| *G05D 1/02* | (2020.01) | |
| *G06F 18/25* | (2023.01) | |
| *G06V 10/80* | (2022.01) | |
| *G06V 20/58* | (2022.01) | |

(52) U.S. Cl.
CPC .............. *G01S 17/86* (2020.01); *G01S 17/89* (2013.01); *G01S 17/931* (2020.01); *G05D 1/0214* (2013.01); *G06F 18/251* (2023.01); *G06V 10/803* (2022.01); *G06V 20/58* (2022.01); *G05D 2201/0213* (2013.01)

(58) Field of Classification Search
CPC .............. G01S 17/931; G05D 1/0214; G05D 2201/0213; G06F 18/251; G06V 10/803; G06V 20/58; G08G 1/165
See application file for complete search history.

(56) References Cited

FOREIGN PATENT DOCUMENTS

| JP | 2013077202 A | 4/2013 |
|---|---|---|
| JP | 2015106382 A | 6/2015 |
| JP | 2017521761 A | 8/2017 |

OTHER PUBLICATIONS

J. Dezert, J. Moras and B. Pannetier, "Environment perception using grid occupancy estimation with belief functions," 2015 18th International Conference on Information Fusion (Fusion), Washington, DC, USA, 2015, pp. 1070-1077. (Year: 2015).*

Machine Translation DE-102014200279-A1 (Year: 2015).*

International Search Report and Written Opinion of the International Searching Authority for PCT International Application No. PCT/IB2019/055145 dated Nov. 15, 2019.

Adarve, Juan David, et al., "Computing Occupancy Grids from Multiple Sensors using Linear Opinion Pools," 2013 IEEE International Conference on Robotics and Automation (ICRA), Karlsruhe, Germany, May 6-10, 2013, pp. 4074-4079 (May 1, 2012).

Dezert, Jean, et al., "Environment Perception Using Grid Occupancy Estimation with Belief Functions," available at https://www.onera.fr/sites/default/files/297/C109.pdf (Jul. 1, 2015) (8 pages).

Fernández, Carlos Gálvez Del Postigo, "Grid-Based Multi-Sensor Fusion for On-Road Obstacle Detection: Application to Autonomous Driving," available at https://www.diva-portal.org/smash/get/diva2:852457/FULLTEXT01.pdf (Jan. 1, 2015).

Moras, Julien, et al., "Credibilist Occupancy Grids for Vehicle Perception in Dynamic Environments," 2013 IEEE International Conference on Robotics and Automation (ICRA), Karlsruhe, Germany, May 6-10, 2013, pp. 84-89 (May 1, 2011).

Pathak, Kaustubh, et al., "3D Forward Sensor Modeling and Application to Occupancy Grid based Sensor Fusion," 2013 IEEE/RSJ International Conference on Intelligent Robots and Systems, pp. 2059-2064 (Oct. 1, 2007).

Seeger, Christoph, et al., "Locally Adaptive Discounting in Multi Sensor Occupancy Grid Fusion," 2016 IEEE Intelligent Vehicles Symposium (IV), Gothenburg, Sweden, Jun. 19-22, 2016, pp. 266-271, IEEE (Jun. 19, 2016).

Office Action issued for Japanese Patent Application No. 2020-560369 dated Feb. 21, 2023.

Second Office Action issued for Japanese Patent Application No. 2020-560369 dated Aug. 15, 2023.

* cited by examiner a) b) c) d)

METHOD FOR VEHICLE ENVIRONMENT MAPPING, CORRESPONDING SYSTEM, VEHICLE AND COMPUTER PROGRAM PRODUCT

CROSS-REFERENCE TO RELATED APPLICATIONS

The present application is a National Stage of International Patent Application No. PCT/IB2019/055145, filed on Jun. 19, 2019, which claims priority to and all the benefits of Italian Patent Application No. 102018000006594, filed on Jun. 22, 2018, both of which are hereby expressly incorporated herein by reference in their entirety.

BACKGROUND OF THE INVENTION

1. Field of the Invention

The description relates to map building techniques and vehicle environment mapping.

One or more embodiments may be related to processing at least one fused grid map to determine objects occupancy, for instance to facilitate detecting the position of obstacles and how to avoid contact with such obstacles.

2. Description of the Related Art

Multi-sensor data fusion may facilitate combining information from different sources in order to form a unified picture, for instance by providing fused occupancy grid maps representing an environment based on data from multiple sources.

Different mapping techniques may provide different types of maps, for instance:
- either specialized for structured environments, thus depending on the presence of such a structure in the surroundings, e.g. feature-based models
- tailored for unstructured environments, e.g. occupancy grid maps.

These two approaches are by no means mutually exclusive, but they in fact supplement each other.

Occupancy grid maps are well suited for path planning and obstacle avoidance tasks. Conversely, feature-based maps may be well suited for localization purposes, where relative pose of the objects may be required for accurate estimation of vehicle self-position and orientation.

Occupancy grid maps, briefly grid maps, represent the (vehicle surrounding) environment as a two-dimensional grid map with fixed dimensions and spatial resolution. The accuracy of a grid map may be defined in terms of the resolution of the discretized binary mesh. Moreover, they may be oriented in the direction of the longitudinal and transverse axes of the vehicle, and may have edge segments disposed at right angles to one another.

A grid map may be provided as a representation of the environment of a vehicle as divided into grid cells, each cell storing a feature describing the environment. For instance, each cell may store a probability/likelihood value, e.g. the probability that a cell is occupied or not. In fact, the map building can be formulated as an optimization problem that maximizes the probability that particular grid cell is in fact occupied (or free) given the prior knowledge of the environment, vehicle position and sensor measurements.

A grid map may facilitate providing to the drive assistance system information about the presence of obstacles and their space occupancy in the surrounding mapped environment. Consequently, the driver assistance system may operate vehicle functions on the basis of that information. For instance, the drive assistance system may react to traffic conditions.

The grid map may represent the environment in a variety of coordinate systems, for instance in Cartesian or polar coordinates, as known to those skilled in the art.

An environment may be scanned via a plurality of sensors/detectors, for instance Global Positioning System (GPS) antenna and/or Geographic Information System (GIS) antenna, LIDAR, camera, etc.

Multiple grid maps may be generated as a function of individual sensors data, providing correlated information about the environment.

Fusing the multiple occupancy grid maps into a unified coherent map combining (e.g. by data fusion) the information of all sensors with high precision and accuracy is an object of the present description, especially with respect to, e.g., drive assistance systems and methods for vehicles or automated vehicles.

Occupancy grid map may facilitate mapping the environment surrounding a vehicle looking for possible obstacles, in order to determine drivable spaces in such a way that an autonomous system capable of estimating its own position may be able to safely navigate through the environment mapped.

As opposed to single sensor mapping, grid maps built as a result of multi-sensor fusion rely heavily on sensor measurement weighting. Traditional approaches to mapping, i.e. the Bayes Occupancy Filter (BOF) or the Dempster-Shafer theory (DST), apply equal weights unless specified by the user. Empirically adjusted sensor weights are tailored for certain scenarios, specifically in situations where the sensors readings are not contradictory.

SUMMARY OF THE INVENTION

An object of one or more embodiments is to overcome the limitations inherent in the solutions achievable from the prior art.

According to one or more embodiments, that object is achieved thanks to a method for vehicle (V) environment mapping, including the steps of receiving a set of input values (Y1, Y2, Yi) from a plurality of sensors (S1, S2, Si), applying temporal fusion processing to the set of input values (Y1, Y2, Yi), resulting in a respective set of occupancy grid maps (G1, G2, Gi), applying data fusion processing to the set of occupancy grid maps (G1, G2, Gi), resulting in a set of fused occupancy grid maps (FF), and processing the set of fused occupancy grid map (FF). The processing operation includes performing an arbitration of conflict in the set of fused occupancy grid maps (FF) and outputting a set of arbitrated fused occupancy grid maps (MM), in particular an arbitrated fused occupancy grid map (M) of drivable spaces. One or more embodiments may refer to a corresponding system, vehicle and computer program product.

The claims form an integral part of the technical teaching provided herein in relation to the various embodiments.

According to the solution described herein, the method comprises providing a fused grid map representation of a vehicle environment, e.g. in the form of an occupancy grid map, as a function of data from multiple sources.

In one or more embodiments, adaptive sensor weights may be applied to multi-sensor fused maps, e.g. iteratively.

Other objects, features and advantages of the present invention will be readily appreciated as the same becomes better understood after reading the subsequent description taken in connection with the accompanying drawings.

BRIEF DESCRIPTION OF THE DRAWINGS

The embodiments will now be described purely by way of a non-limiting example with reference to the annexed drawings, in which.

DETAILED DESCRIPTION OF THE INVENTION

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment.

Moreover, particular conformations, structures, or characteristics may be combined in any adequate way in one or more embodiments.

The references used herein are provided merely for convenience and hence do not define the extent of protection or the scope of the embodiments.

Figure 1:
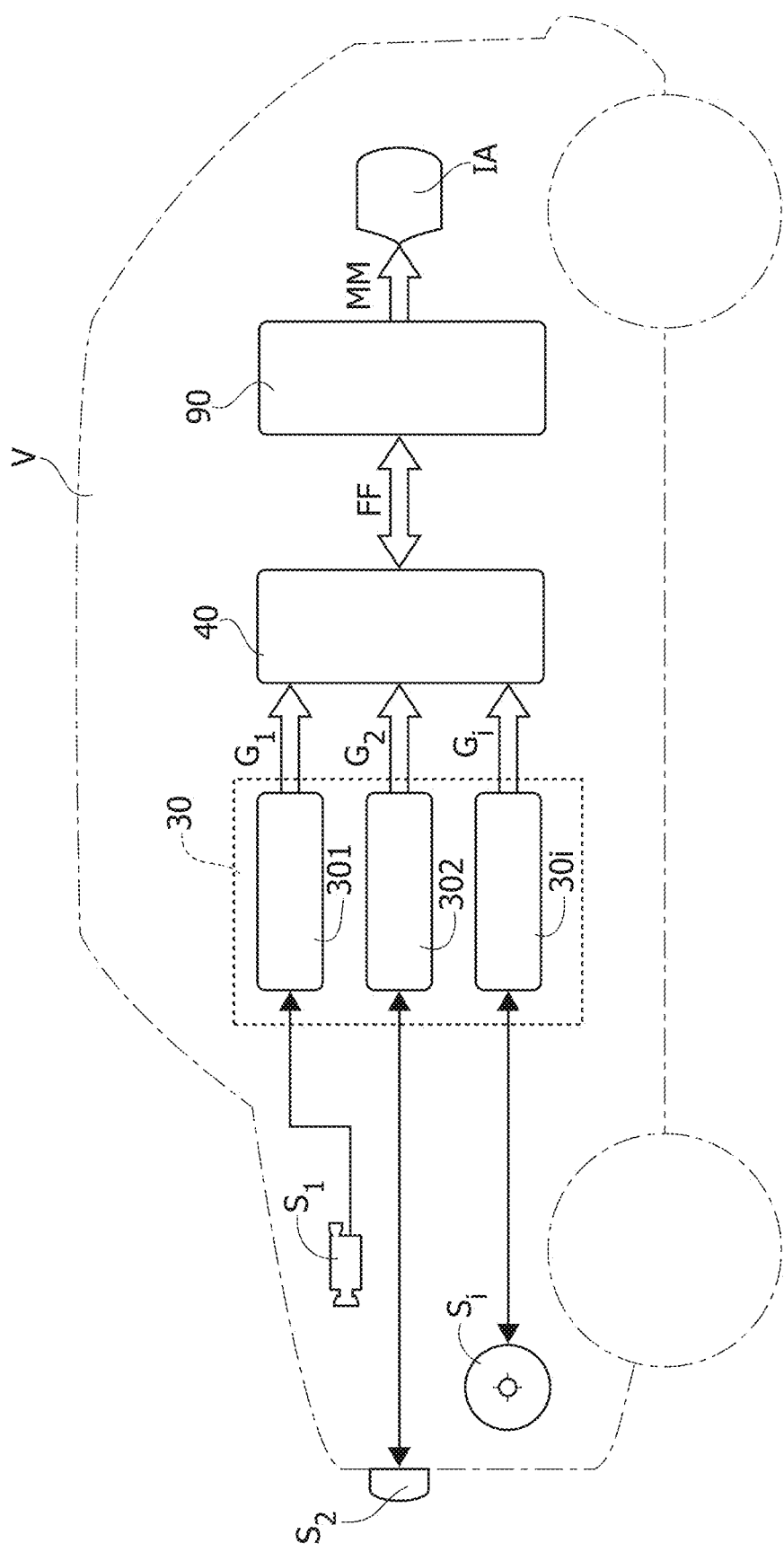
FIG. 1 is a functional diagram exemplary of a vehicle according to embodiments.

In FIG. 1 it is shown a functional diagram exemplary of a vehicle according to one embodiment of the solution here described. Such embodiment comprises a vehicle V equipped with a plurality of sensors $S_1$, $S_2$, $S_i$, and a drive assistance system 100 configured to provide, on the basis of a set FF of fused occupancy-grid maps, including at least one fused occupancy-grid map F of an environment elaborated by the system 100 on the basis of the measurement of the sensors $S_1$, $S_2$, $S_i$, a set MM of arbitrated fused occupancy grid map, including at least one arbitrated fused occupancy grid map M, e.g. a map in which part of all conflicts determined in the data fusion operation to obtain the at least one fused occupancy-grid map F, are decided. Such decided fused occupancy grid map M in the embodiment here discussed, corresponds to a map of drivable spaces.

For instance, said vehicle V may be an autonomous land vehicle such as a self-driving car. Other examples of vehicles may be car-like vehicles, self-moving robots, etc.

The plurality of sensors/detector devices $S_1$, $S_2$, $S_i$ includes sensors, known per se, such as LIDAR/radar sensor, camera, GPS antenna and sources using the GPS information such as (GPS/GIS) context map, etc., and it is coupled to the system 100. Specifically, in the example shown the sensors are a LIDAR, a camera and a GPS/GIS system producing a (GPS/GIS) context map on the basis of the detected position.

The set of sensors $S_1$, $S_2$, $S_i$ may in general comprise sensors having:
  complementary functions, for instance covering different field of view areas of the environment explored by the vehicle and/or in the exploited physical working principle,
  coherent functions, for instance providing data about a same field of view and/or acquiring data via a same physical working principle on the same field of view.

The system 100 in general makes available the arbitrated map M either to a user, e.g. as aid for assisted driving, or to a further system which uses the decided map M to control the vehicle V, such as a system for automated driving. In FIG. 1 it is shown that the system 100 may be coupled to an output interface IA. For instance, the interface IA may be a user interface which comprise a display unit, which can be used to display such arbitrated fused occupancy-grid map of drivable spaces M. Alternatively the data of the map available at the output interface IA can be used and processed by a further system.

The system 100 is configured to process the measurements data ("readings") $Y_1$, $Y_2$, $Y_i$ from the set of sensors $S_1$, $S_2$, $S_i$, providing a set FF of fused occupancy-grid map F, E (out of data fusion block 40) toward the output interface IA.

As mentioned, the arbitrated fused occupancy-grid map of drivable spaces M available at the interface IA may be used by a control system of the vehicle to operate the vehicle itself, e.g. navigating the environment represented in the fused occupancy grid map M provided as output by the system 100.

As exemplified in FIG. 1, the system 100 comprises in general the plurality of sensors $S_1$, $S_2$, $S_i$, a set of temporal fusion stages 30, a data fusion stage 40 and an arbitration stage 90.

In particular, the plurality of sensors $S_1$, $S_2$, $S_i$ is brought as input to a set of temporal fusion stages 30. The set of temporal fusion stages 30 receives the set of sensor readings $Y_1$, $Y_2$, $Y_i$.

The set of temporal fusion stages 30 may comprise, as shown in FIG. 1, a first temporal fusion stage 301, a second temporal fusion stage 302, an i-th temporal fusion stage 30i, to process individual readings from each sensor, e.g. $Y_i$, in the plurality of sensor readings $Y_1$, $Y_2$, $Y_i$, providing as output a set of sensors occupancy grid maps $G_1$, $G_2$, $G_i$, as discussed in the following.

For instance, the set of temporal fusion stages 30 may be distributed across respective sensors, providing local decentralized processing of sensor readings, in a manner known per se (e.g. via software).

In the exemplary embodiment shown in FIG. 1:
  the first temporal fusion stage 301 receives the first dataset $Y_1$ of sensor readings from a first sensor $S_1$ and provides as output a first map $G_1$, the second temporal fusion stage 302 receives the second dataset $Y_2$ of sensor readings from a second sensor $S_2$ and provides as output a second map $G_2$, the i-th temporal fusion stage 30i receives the i-th dataset $Y_i$ of sensor readings from a i-th sensor $S_i$ and provides as output a i-th map $G_i$.

Thus, each temporal fusion stage 301, 302, 30i in the set of temporal fusion stages 30 provides a set of occupancy grid maps $G_1$, $G_2$, $G_i$ expressed in vehicle frame, as a function of respective sensor readings $Y_1, Y_2, Y_i$ from the set of sensors $S_1, S_2, S_i$.

Alternatively, the i-th sensor/source may also provide as reading directly a grid map Gi, such as it may be the case when acquisition of a GIS/GPS map from a remote sensing source is involved.

As mentioned, in variant embodiments, the operation of processing sensor readings $Y_1, Y_2, Y_i$ in the set of temporal fusion stages 30 may comprise:

- coordinate system transformation operations, e.g. from a sensor frame to a vehicle frame,
- temporal fusion operations, e.g. data normalization, synchronization of data in accordance with the working time of the vehicle,
- data fusion operations, e.g. combination, association, correlation, estimation of data.

Preferably, at least one i-th map $G_i$ in the set of maps $G_1$, $G_2$, $G_i$ provided by the set of temporal fusion stages 30 provides information about specific features of the environment, as a function of the type of measurement provided by the i-th sensor Si.

Figure 2:
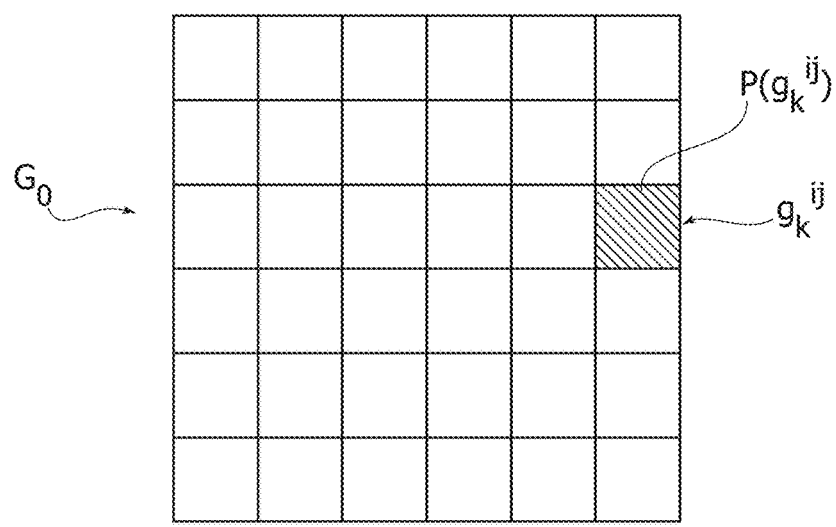
FIG. 2 is a view of embodiments of an occupancy grid map.

FIG. 2 is a view of an exemplary occupancy grid map $G_0$, e.g. an a priori grid map for system initialization for processing data from a i-th sensor.

An occupancy grid map typically comprises a number N=n*m of individual cells $g^{ij}_k$, where n is the number of lines and m is the number of columns, indexed by indices i and j, respectively.

Specifically, any individual cell $g^{ij}_k$ in the grid map $G_0$ preferably has a fixed size and predefined geometry, e.g. square, as in a Cartesian coordinate system.

An occupancy grid map $G_0=G_{0,k}$ may evolve in time, thus being a function of the time k.

Each cell $g_{ij}$ of the grid $G_0$ may be a variable, e.g. a random variable, which can assume a certain number of "state" values with a certain probability (at a time k).

Each cell $g^{ij}_k$ of the grid in the embodiment shown comprises a random variable numeric value and a "state" value (classification) associated, for instance:

- the numeric value may be a probability value $p(g^{ij}_k)$, estimating the probability that the portion of environment mapped by the individual cell is correctly estimated as "occupied" by an object,
- the "state" label value (e.g., free/unknown/occupied) may be assigned from a list of possible state values as a function of the probability value $p(g^{ij}_k)$, indicative of the state of occupancy of portion of environment mapped by the cell of the grid map.

Typically, if a probability value stored in a cell is:
below a certain threshold value, e.g. $p(g^{ij}_k)<0.5$, the cell is classified with a first state label, e.g. "free", which is assigned to the corresponding cell,
above a certain threshold value, e.g. $p(g^{ij}_k)>0.5$, the cells classified with a second state label, e.g. "occupied", which may be assigned to the corresponding cell,
equal to a certain threshold value e.g. $p(g_{ij})\neq 0.5$, the cell is classified with a third state label, e.g. "unknown", which is assigned to the corresponding cell.

The grid map is usually described in terms of a two-dimensional grid, e.g. $G_k=\{g^{ij}_k: 1\leq i\leq n, 1\leq j\leq m\}$.

Figure 7:
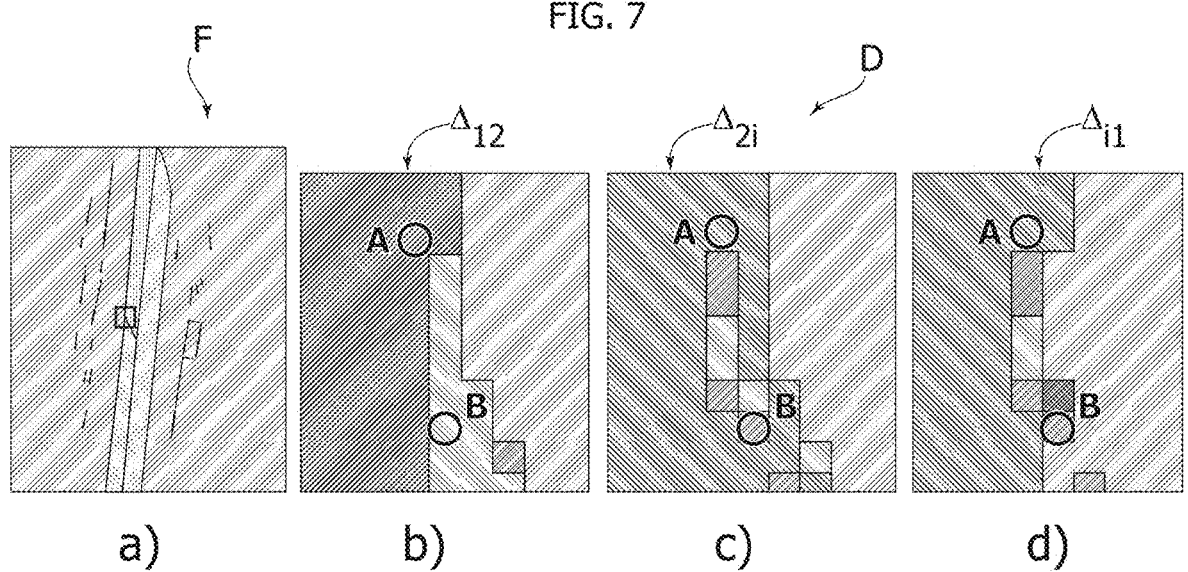
FIG. 7 is exemplary of possible views of embodiments of the processing of FIG. 1.

When visualizing the grid map on a display or in any graphic form, the information regarding the classification label of each grid cell may be encoded as a pattern/color filling the grid cell area, as shown e.g. in FIGS. 2, 4 and 7.

The probability distribution $p(g^{ij}_k)$ associated to random variables in each grid cell $g^{ij}_k$ evolves in time as fresh sensor readings are acquired from sensors and it is updated accordingly taking into account the sensor measurements $Y_i$ and a vehicle pose V, at every time instant k.

Figure 3:
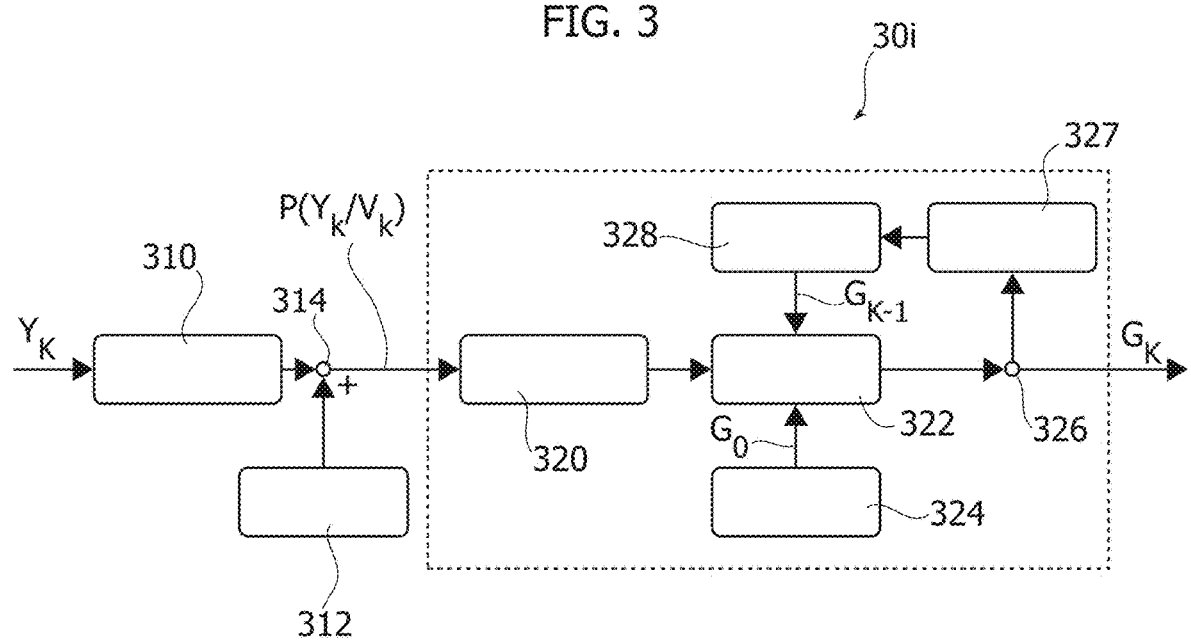
FIG. 3 is exemplary of a possible arrangement portion of the processing of FIG. 1.

FIG. 3 is exemplary of a diagram illustrating embodiments of a i-th temporal fusion processing stage 30i.

Temporal fusion processing 30i refers to aggregating the information received in sensor readings, e.g. readings $Y_{i,k}$ taken from the i-th source $S_i$ at time k are aggregated with readings $Y_{i,k-1}$ from the i-th source $S_i$ at a previous time k−1.

Thus, each temporal fusion stage 301, 302, 30i provides a set of occupancy grid maps $G_1$, $G_2$, $G_i$, expressed in vehicle frame, as a function of respective sensor readings $Y_1, Y_2, Y_i$ from the set of sensors $S_1, S_2, S_i$.

The temporal fusion processing stage 30i may comprise operations of coordinate system transformations 301, 302, 30i, from a sensor frame to a vehicle frame, as:

- format sensor readings into vectors having characteristics associated to a preferred sensor model,
- compute inverse likelihood/sensor models, to extract information regarding the environment from the measurement value,
- take into account the presence of measurement errors in the sensor readings.

As exemplified in FIG. 3, the i-th temporal stage 30i receives a dataset $Y_k$ of sensor readings/measurements at a given time k from the i-th sensor $S_i$, e.g. in the form of a n-dimensional vector $Y_k=(y^1_k, y^2_k, \ldots, y^n_k)$.

Similarly, the vehicle state $V_k$ (e.g. its position) at a given time k may be known (e.g. stored in stage 312) and it may be described as an m-dimensional vector, e.g. $V_k=(v^1_k, v^2_k, \ldots, v^m_k)$. For instance, the pose of the vehicle $V_k$ may be parametrized by centroid position and orientation angle of the vehicle V with respect to the ground plane.

The vehicle pose/state $V_k$ and sensor readings $Y_k$ at a certain time k are combined, for instance to provide an input in the form of likelihood value, e.g. $p(Y_k|V_k)$, to be fed into the temporal fusion processing stage 30i.

A Bayesian Occupancy Filter (BOF) is adequate for use as described herein. The BOF is for instance a valid formulation to compute a posterior probability $p(G_k|Y_k,V_k)$ of the occupancy grid map $G_k$ at the time k for use in calculating the updated probability values of grid cells of the occupancy grid map $G_i$, taking into account the fresh set of sensor readings.

To perform the temporal fusion processing 30i, an initial occupancy grid map $M_0$ is provided, e.g. stored/generated in stage 324. The initial grid $M_0$ for instance is initialized:

- with the state of every cell classified as "unknown", e.g. an assigned probability value $0.45<p(g^{ij}_0)<0.55$, if no prior information is available about the environment surrounding the vehicle, and/or
- with a grid cells values being loaded if a priori information about the environment is known. For instance, when a vehicle enters/exits a house garage, stage 303 may be operated—by an autonomous control system—as to provide an initial occupancy grid map $M_0$ according to the a priori known garage planimetry).

Also, a "previous" grid map $G_{k-1}$ is generated/stored in stage 307 of the temporal fusion stage 30i, with grid cells having probability values computed in a time k−1 preceding the time k of acquisition of the sensor readings.

It is noted that at the start-up of the system, the initial grid $M_0$ and the "previous" grid map $M_{k-1}$ may have equal values, e.g. $M_{k-1}=M_0$.

The temporal fusion stage 30i fuses a priori map knowledge $M_0$ and/or the "previous" grid map $M_{k-1}$, e.g. in stage 322, with fresh data in the form of measurement likelihoods $p(y_k|x_k)$.

The Bayes theorem states that the probability $p(g^{ij}_k|y_k,x_k)$ that a cell $g^{ij}_k$ of the grid map $M_k$ at the time k is occupied (or free) is proportional:

to the probability $p(g^{ij}_{k-1}|y_{k-1},x_{k-1})$ of the cell $g^{ij}_{k-1}$ of the "previous" grid map $M_{k-1}$ at the "previous" time k−1, and to the probability $p(g^{ij}_k|y_k,x_k)$, e.g. computed according to an inverse likelihood model, the Bayesian gain, $f\{p(not(g^{ij}_k)|y_k,x_k)-p(g^{ij}_k|y_k,x_k)\}$.

Figure 5:
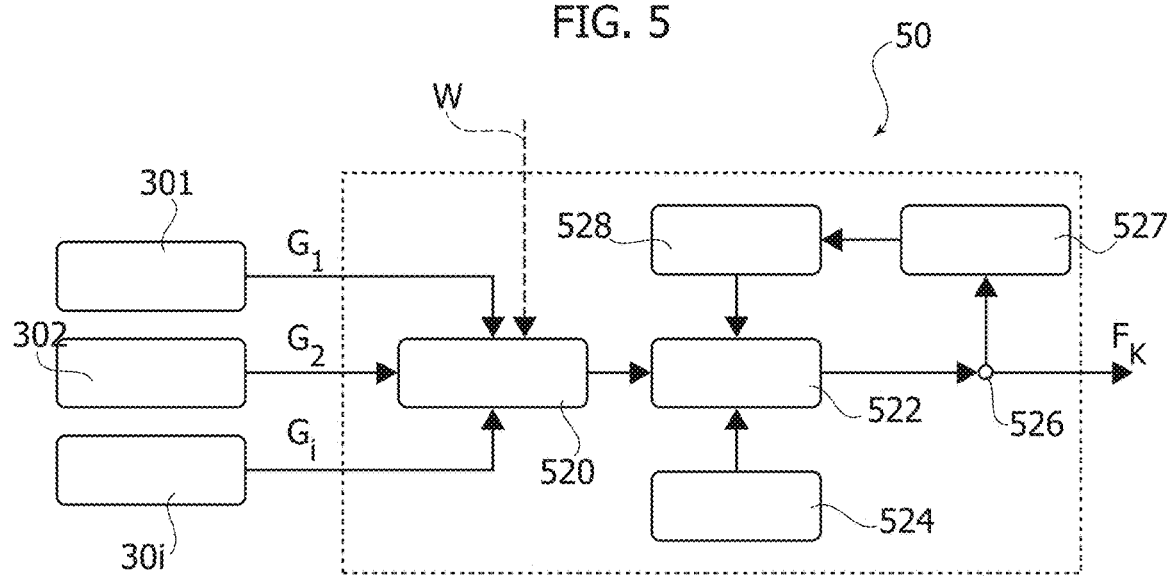
FIGS. 5 and 6 are exemplary of a possible arrangement portion of the processing of FIG. 1.

The Bayesian gain is computed in a gain stage 520, shown in FIG. 5.

It is noted that in the hypothesis of a priori unknown boundaries of the map, the Bayesian gain is computed solely on the bases of the measurements.

A forgetting factor 327 is also applied, in the exemplary embodiment shown in FIG. 3, to the sensor occupancy grid, e.g. to the "previous" map. The forgetting factor stage may introduce a parameter, e.g. an exponential decay factor, to apply to grid cells values, as a design parameter to increase or decrease the weight of updated grid $G_k$ on a "prior" grid $G_{k-1}$.

The temporal fusion processing 30 may thus be formulated as a recursive solution to the problem of at maximizing the probability $p(g^{ij}_k)$ that a particular grid cell $g^{ij}_k$ is in fact occupied (or free), given the prior knowledge of the environment $G_0$, vehicle position $V_k$ and sensor readings $Y_k$.

It is noted that grid map G, e.g. $G=G_i$, at time k (indicated as $G_k$) is the result of processing sensor readings at time k, e.g. $Y_{i,k}$, and the prior map G at time k−1 (indicated as $G_{k-1}$). Also, the prior map $G_{k-1}$ contains not only information relative to time k−1 itself, but it contains information regarding the entire evolution of the map from the time origin to the time k−1 (e.g., from time 1 up to time k−1).

Moreover, when indicating a sensor occupancy-grid map $G_i$ reference will be made to a single "time frame" of the evolution of the map G in time k, without limitation to the embodiments, according to first order Markov assumption. Said otherwise, a full map history, from time 1 to k−1, is represented/captured within a single map G at time k−1.

Figure 4A:
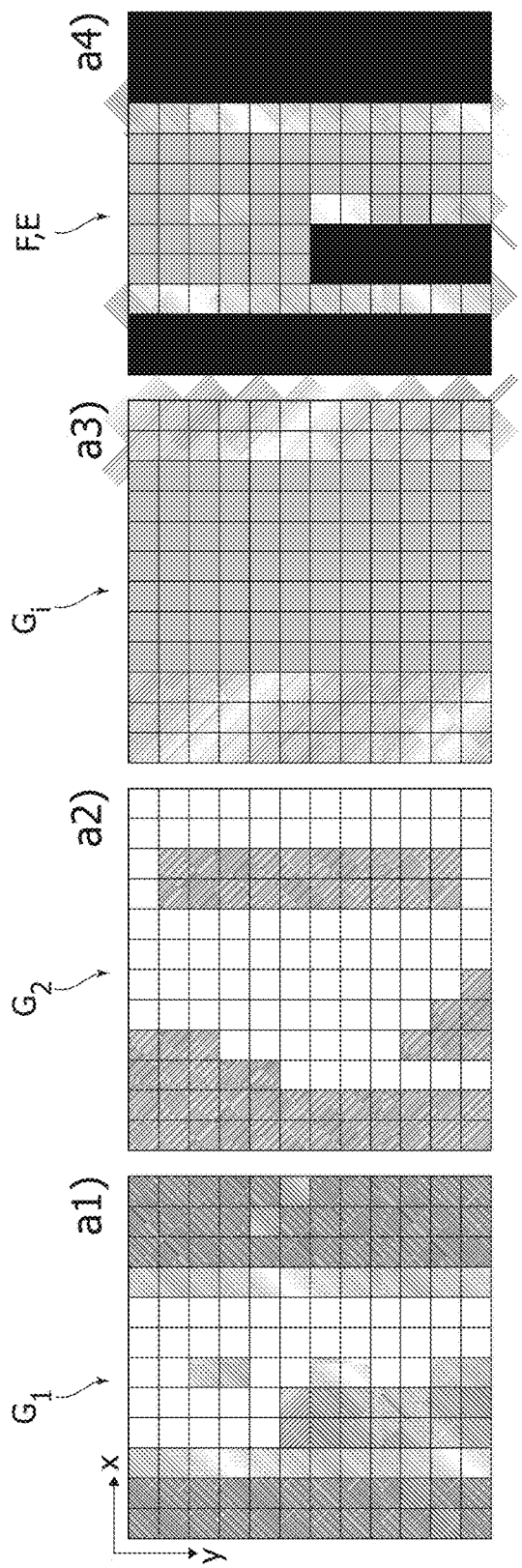
FIG. 4A is exemplary of possible views of occupancy-grid maps according to embodiments.
Figure 4B:
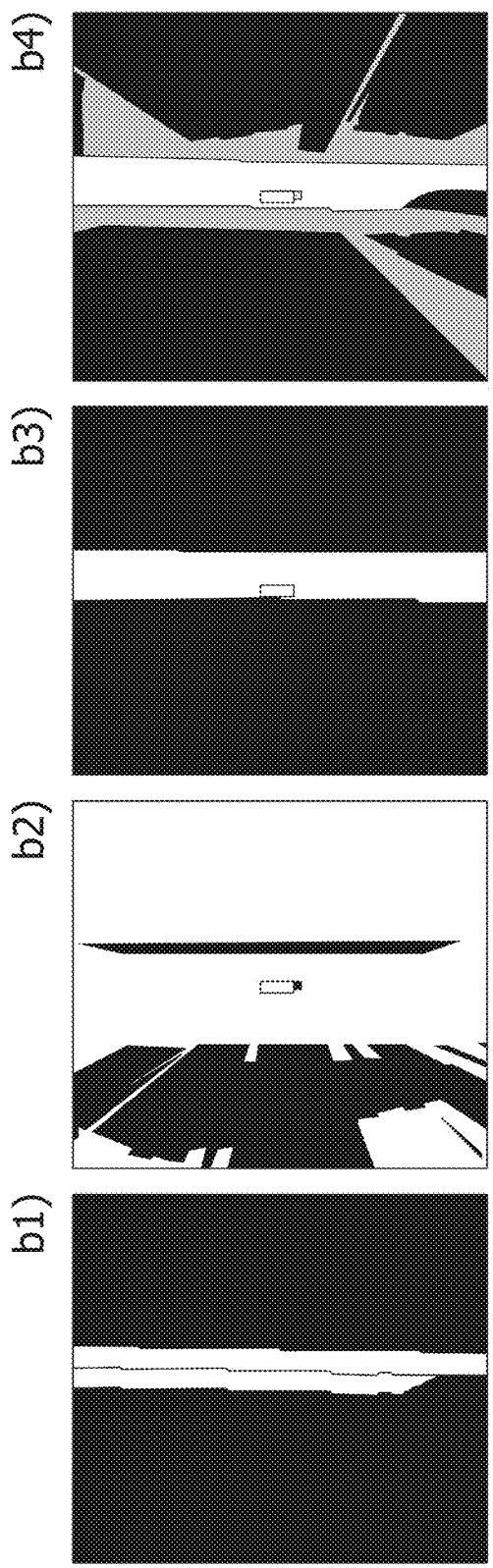
FIG. 4B is exemplary of possible views of occupancy-grid maps according to embodiments.

FIGS. 4A and 4B are views of possible sensor occupancy grid map-frames $G_1$, $G_2$, $G_i$ processed from the plurality of sensor readings $Y_1$, $Y_2$, $Y_i$ from respective sensors in the plurality of sensors $S_1$, $S_2$, $S_i$. In particular, individual portions a1), a2) a3), a4) of FIG. 4A represent enlarged views of respective portions b1), b2), b3), b4) of FIG. 4B.

The respective "state" labels classifying the content of grid cells of respective sensor occupancy grid maps may vary as a function of the sensor readings parameters/working principles of each sensor.

In fact, respective sensor occupancy grid maps $G_1$, $G_2$, $G_k$ may each provide information about specific features of the environment.

For instance, in the example shown:

the first occupancy grid map $G_1$ is the result of processing data from a visual sensor, thus providing information both on static and dynamic objects and on the topology of the environment (e.g. road with lanes).

the second grid map $G_2$ is the result of processing data from LiDAR sensors, providing information about estimated distance of static and/or dynamic obstacles.

the i-th map $G_i$ is the result of processing data from a sensor represented by Geographic Information System (GIS), providing context information data on the environment (e.g., road/off-road areas). The GIS, as known, integrates remote sensing imagery, i.e. imagery obtained by making measurements of the earth using sensors on airplanes or satellites.

Specifically, after respective sensor occupancy grid maps $G_1$, $G_2$, $G_i$ are generated in the temporal fusion stage 30 via temporal fusion processing 30i of sensor readings $Y_1$, $Y_2$, $Y_i$, for every time step k, the grid maps in the set of sensor occupancy grid maps $G_1$, $G_2$, $G_i$ are "fused" together in the set FF of fused maps which includes at least one "fused" occupancy grid map F, E.

In order to do so, the grid fusion stage 40 receives the set of maps $G_1$, $G_2$, $G_i$ and provide as an output at least one "fused" occupancy grid map F, E by performing fusion operations on data in (e.g., timed frames $G_{1,k}$, $G_{2,k}$, $G_{i,k}$) of the set of maps $G_1$, $G_2$, $G_i$.

Different approaches may be used for data fusion 40, which may include at least one of combining, associating, estimating, correlating operation, in data in (timed frames) of the set of maps $G_1$, $G_2$, $G_i$.

Figure 8B:
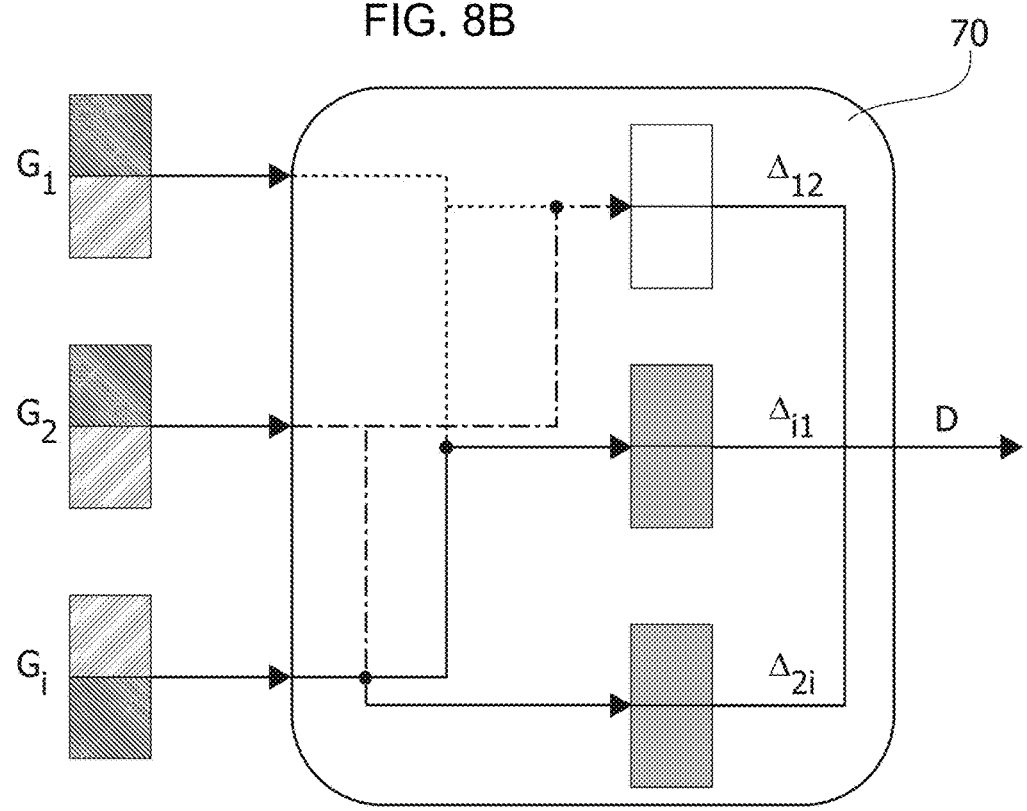
FIGS. 8A, 8B and 9 are exemplary of possible arrangement portions of the processing of FIG. 1.
Figure 8A:
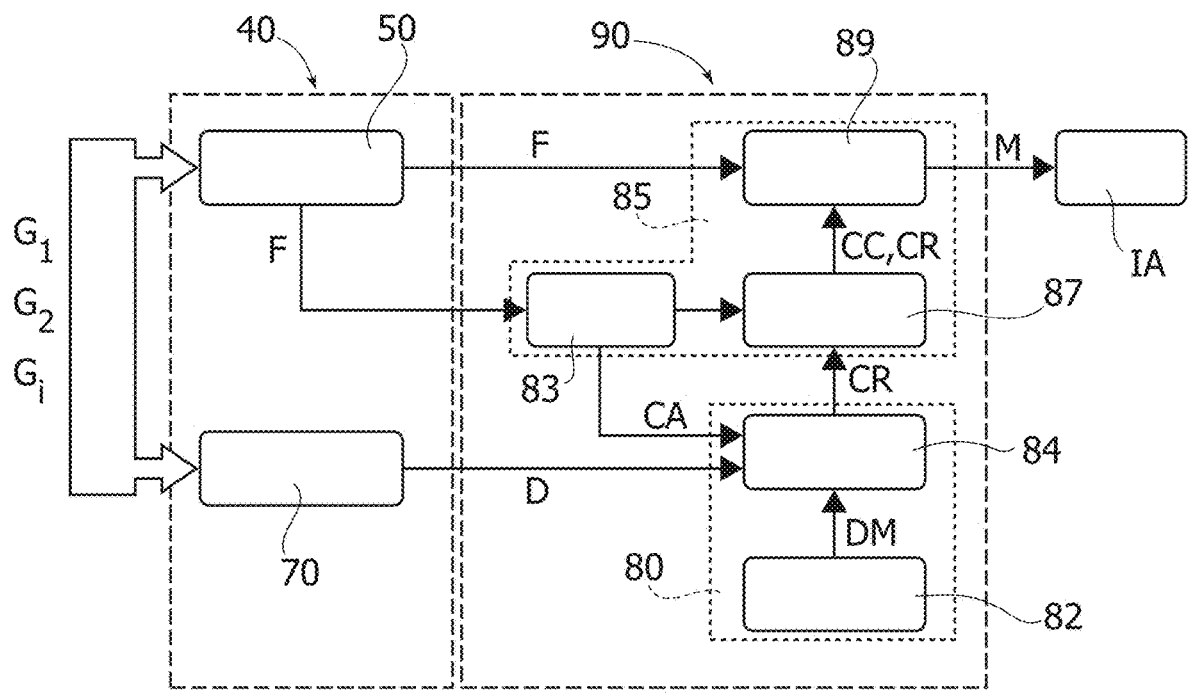
Figure 9:
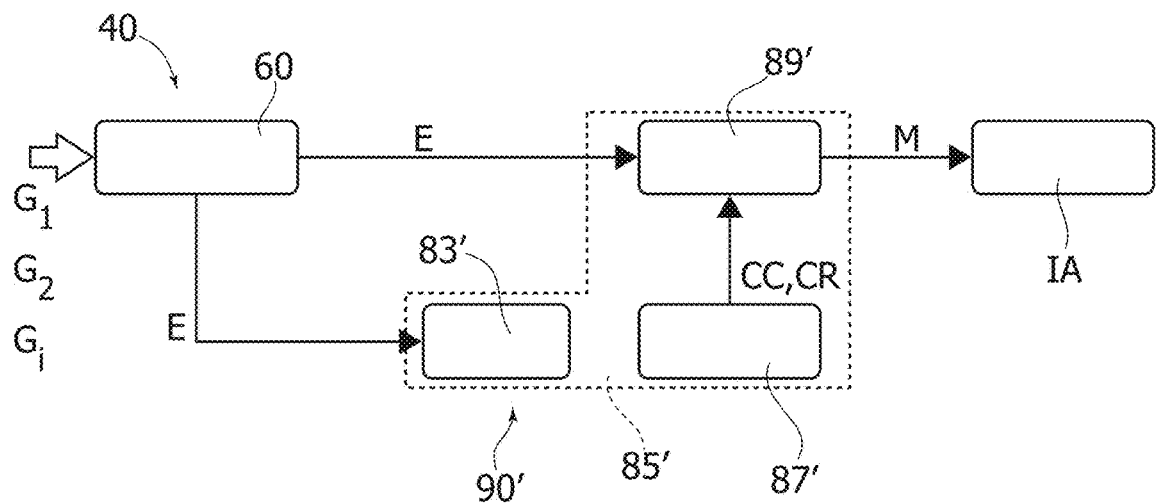

These two approaches are summarized in the two embodiments represented in FIGS. 8A, 8B and 9, which represents implementations of the data fusion block 40.

For instance, a data fusion based on Bayesian inference 50, as shown in FIGS. 8A and 8B, or Dempster-Shafer Theory 60, as shown in FIG. 9, can be used, as exemplified in FIG. 1.

The fused grid map may thus facilitate accurately predicting and/or detecting the occupancy of an obstacle along the path of travel of the vehicle V, facilitating the online correction for the path of travel of the vehicle V by a drive assistance system/interface.

For instance, it may facilitate avoidance of a collision between the vehicle and the obstacle when the vehicle is operated by an autonomous driving system (not visible in the figures).

As anticipated above, for instance, grid fusion processing 40 may comprise at least one of:

a Bayesian Inference/Bayesian Occupancy Filter (BOF) fusion processing stage 50, a Dempster-Shafer Theory (DST) fusion processing stage 60.

In fact, at least one of Bayesian Occupancy Filter (BOF) (see, e.g. FIG. 5) and Dempster-Shafer theory of evidence (DST) (see, e.g. FIG. 6) are suitable for use in the grid fusion processing stage 40. Although in FIGS. 8A, 8B and 9 are represented respective separate implementations, the grid fusion processing stage 40 and the arbitration stage 90 can include both the BOF and DST embodiments operating in parallel.

As exemplified in FIG. 5, in BOF fusion 50 the fusion processing formula combines the data in the respective grid cells of respective sensor occupancy grid maps in the set of sensor occupancy grid maps $G_1$, $G_2$, $G_i$ on the basis of a set of weighs $W_k$, e.g. $W_k=[w_{k,1}, w_{k,2}, w_{k,i}]$, indicative of a respective level of confidence in the accuracy of the respective sensor readings $Y_1$, $Y_2$, $Y_i$.

In a general form, the result of BOF (grid fusion processing) 50 can be expressed in terms of a weighted (linear) combination of sensor occupancy grid maps resulting from temporal fusion, for instance as:

$$W_k = \sum_{i=1}^{n} w_{k,i}$$

$$G_k = w_{k,0}^{-1} \sum_{i=1}^{n} w_{k,i} G_{k,i}$$

Unless specified a priori by the user and/or by design, sensors are assumed to bring equal contribution to the BOF grid fusion process 50, i.e. maps are combined with equal weights, e.g. $w_{k,i}=w_k$.

In the classical Bayesian setting, which assumes a spatiotemporal relationship between grid cells $g_k^{ij}$, the truthfulness (probability) of the map p ($F_k|G_k$) as a combination of multiple sensor grids $G_{k,i}$ is evaluated via the Bayes theorem, i.e.

$$p(F_k \mid G_k) = \frac{p(G_k \mid F_k) p(F_k \mid G_{k-1})}{p(G_k)}$$

in which the estimate about the map occupancy is compared to each individual sensor grid $G_k$ in the form of a likelihood $p(G_k|F_k)$.

However, grid-based approaches do not have the ability to predict the behavior of the objects, as this will require the implementation of feature recognition and data association techniques, and thus solely rely on measurement weighting. Similarly, as in temporal fusion, without the model based prediction the expected map change from time k−1 to k is $p(F_k|F_{k-1})=0$. Therefore, the Bayesian gain $f\{p(\text{not}(F_k)|G_k)-p(F_k|G_k)\}$ may not be able to determine the sensor weights $w_k$. Empirically adjusted sensor weights may be tailored only for certain scenarios and thus may not be suited for general purpose mapping. It therefore becomes apparent, that sensor weights need to be adjusted recursively during the grid fusion process.

Therefore, for instance, an error $\delta w_{k,i}$ between a true weight $w_{k,i}$ and an actual value $\hat{w}_{k,i}$ of the i-th sensor weight may be expressed as:

$$\delta w_{k,i} = w_{k,i} - \hat{w}_{k,i}$$

A feedback network providing iteratively adjustable weights, e.g. in dataset W provided by the arbitration stage 90 as discussed in the following, may facilitate automatic sensor weights $w_k$ adjustments during BOF fusion.

Figure 6:
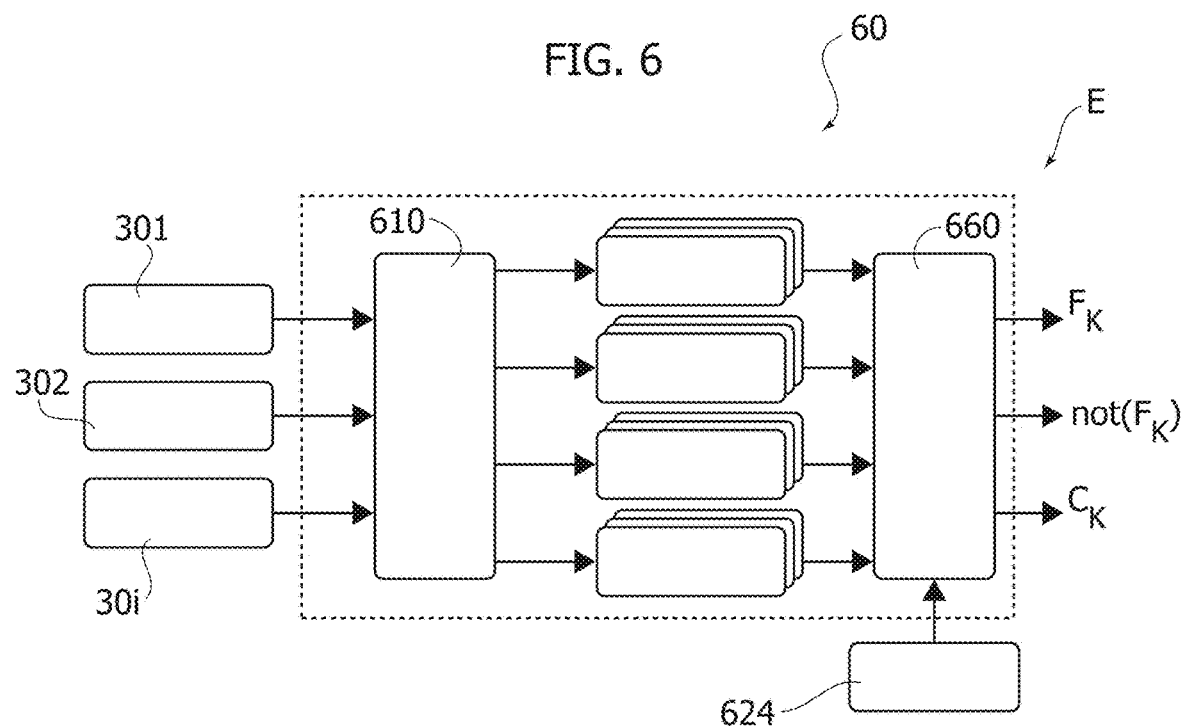

Alternatively, a set of combination rules known as the Dempster-Shafer theory of evidence (DST) may be employed, for instance in block 60 of FIG. 9, detailed in FIG. 6. DST was developed to address the uncertainties occurring between occupancy grids by utilization of combination rules, i.e. theory of evidence, applied on evidential grids.

In fact, according to Bayes' theorem, the occupancy of the cell is evaluated based on single probability per cell, while in DST the decision about occupancy is made based on belief function of four "masses". Furthermore, the belief transition in the Bayes' theorem is possible only between two states and is symmetrically restricted.

DST processing 60, as exemplified in FIG. 6, provides as output at least one occupancy grid map $F_k$ and/or complementary occupancy grid maps: e.g. not($F_k$) and/or a conflict grid map $C_k$. The set of fused grid maps $F_k$, not($F_k$), $C_k$ provided as output of DST processing 60 may be collectively indicated as "evidential grids" E.

Similar to what was discussed in relation to FIG. 2, the evidential grids maps E have individual grid cells having probability values assigned. Moreover, the classification related to probability values comprises more than a binary set of "states" of the cells: in fact, uncertainties are modeled as a belief function Bel(X).

The "belief" (i.e. evidence that supports the state proposition, the degree to which the classification is believed to be true) about the environment occupancy is classified by either occupied (O) or free (FR), which results into a set of all possible states of a random variable X={O, FR}. The set of the possible subsets of X, i.e. the "frame of discernment" (briefly, FOD), is denoted as $2^X$={occupied (O), free(FR), unknown (Ω), conflict (Ø)}. The main objective of DST is to compute the belief Bel(X), a resulting probability that accounts for all the evidence that supports any proposition X in the frame of discernment $2^X$. Thus, the belief function Bel(X) represents the degree to which X is believed to be true, and may be expressed as:

$$Bel(X) = \sum_{A \subseteq X} m(A)$$

where:
X is any state among the possible states $2^X$, e.g. X=O,
m(A) is the basic probability density function value, also known as "mass" of A, for every subset A comprised in $2^X$ containing state X, e.g. m(A)=m(O), m(O,FR), m(O, Ω), m(O, Ø) if X=O;
Bel(X) is a subset of $2^X$ accounting for all the evidence that supports the proposition X.

The content of cells in an evidential grid map E (indicated also as "likelihood") is an indicator of the degree of reliability of detection of the presence of objects/obstacles in the environmental space surrounding the vehicle V.

The process of DST fusion 60 usually starts with a basic mass assignment (BMA) stage 610, comprising a process based on hard constrains that redistributes the four masses across the occupancy grid map cells $p(g_{k,i})$. The result of BMA is subsequently provided into the Dempster-Shafer combination rule stage 690, as discussed in the following.

For instance, two sources of information, e.g. sensor occupancy grid maps $G_1$ and $G_2$, are combined into a fused belief function having a "joint mass" m through the XOR operator $\oplus$, whose value is usually calculated as:

$$m(X) = (G_1 \oplus G_2)(X) = \frac{(G_1 \cap G_2)(X)}{1 - (G_1 \cap G_2)(\Omega)} \text{ for } X \neq \Omega$$

$$m(X) = G_{12}(X) = (G_1 \oplus G_2)(X) = 0 \text{ for } X = \Omega$$

The order in which the sensors are fused is irrelevant given the commutative property.

In the evidential approach, the belief can be transferred among four states, in which each of these transitions has a different meaning, dynamic and importance. While the DST models a higher level of confidence in cells than just a single probability value, sensor grid weighting $w_k$ remains unsolved at this stage.

As shown in the embodiment of FIGS. 8A and 8B referring to a data fusion block 50 performing BOF, the set of temporal fusion stages 30 is coupled in this embodiment to a grid fusion state 40 comprising a data fusion block 50 based on Bayesian inference 50 and a discrepancy assessment stage 70.

The discrepancy assessment stage 70 receives the set of maps $G_1, G_2, G_i$ and provides a set of detected discrepancies D comprising information about the result of an operation of comparing the maps, e.g. one-to-one. The comparison operation can be performed by any different technique suitable to identify at least the equal and different, i.e. conflicting, cells between maps.

For instance, the set of detected discrepancies D may comprise:
- a set of locations of conflicting cells among respective sensor grid maps, as discussed in the following, and/or
- a set of values indicatives of disagreement between pairs of sensors, e.g. resulting from subtracting the probability values of grid cells in a first sensor grid from the probability values of corresponding grid cells in a second sensor grid.

For instance, the abovementioned information may be combined in a matrix form.

FIG. 7 is exemplary of a possible result of processing the set of maps in the discrepancies detection stage 70.

As illustrated in FIG. 7, portion a) is an exemplary time frame of the fused map F, a portion of which (bounded with a black box) is enlarged in portions b), c) and d) of FIG. 7.

As different sensors provide different information, possibly conflicting between each other, a vast majority of grid cells of the fused map F, E may have associated values corresponding to highly conflicting or uncertain information about the space occupancy, i.e. $p(g_k^{ij} \approx 0.5)$.

Consequently, the discrepancy process stage 70 may provide a set of detected discrepancies D containing a structured information about the presence of conflicts between groups of occupancy grid maps, in particular for specifying where the conflict is and to which group, e.g. pair, of compared grid maps the conflict is related.

Specifically, the set of detected discrepancies D comprises, for instance:
- a first discrepancy $\Delta_{12}$, indicative of the disagreement between the first $G_1$ occupancy grid map and second $G_2$ occupancy grid map;
- a second discrepancy $\Delta_{2i}$, indicative of the disagreement between the second occupancy grid map $G_2$ and the i-th occupancy grid map $G_i$;
- an i-th discrepancy $\Delta_{i1}$, indicative of the disagreement between the i-th occupancy grid map $G_i$ and the first occupancy grid map $G_1$.

For example, such information may be stored/encoded in the set of detected discrepancies D in the form of an array having discrepancy components $\Delta_{12}, \Delta_{2i}, \Delta_{i1}$, each storing the result of each comparison of groups of sensor grid cells, e.g. containing a "conflict" value for every cell in respective grid maps cells.

The "conflict" value may be calculated by subtracting probability values in cells of a map from the probability values in cells of a different map.

An effect of the presence of the discrepancy process stage 70 is to facilitate automatic calibration of merging and manipulating the temporally fused grid maps $G_1, G_2, G_i$ generated from readings $Y_1, Y_2, Y_i$ provided by sensors $S_1, S_2, S_i$. In fact, knowledge of "conflict" values $\Delta_{12}, \Delta_{21}, \Delta_{i1}$ in the set of discrepancies D can be used to "tip" the probability of "uncertain" cells of the fused map F, E to either an "occupied" or a "free" state via conflict arbitration stage processing 90, providing a "harmonized" or arbitrated drivable fused map M with a reduced number of conflicting cells.

As exemplified in FIG. 8A, the data fusion stage 40 and the discrepancy assessment stage 70 are coupled to the arbitration stage 90, which receives as input a set of maps FF comprising, in the case of the embodiment of FIGS. 8A and 8B, with the BOF data fusion block 50, the fused map F and the set of detected discrepancies D.

In the case of the embodiment of FIG. 9, the arbitration stage 90' receives a set FF which includes the fused map F and the evidential grids E.

The arbitration stage 90, 90' as exemplified in FIGS. 8A and 9 comprises substantially an occupancy grid processing stage 85 (in FIG. 9 indicated as 85'), receiving as input the set FF of fused maps and providing as output a set MM of arbitrated fused maps, such stage 85 usually comprising a conflict detection stage 83, a conflict resolution stage 87 and a conflict correction stage 89. In FIG. 9 the variant embodiment is indicated with 90' and the corresponding blocks are indicated with a "prime" apex, 85', 83', 89', 87' to show a possible different internal implementation of the corresponding functions.

The conflict arbitration stage 90 may use different approaches for resolving the possible conflicting, e.g. contradictory, information provided by the sensors on the occupancy state of the cells of the fused grid F and/or evidential grids E, as a function of the approach used in the data fusion processing stage 40, e.g. BOF fusion 50 and/or DST fusion 60.

Specifically, in a variant embodiment as exemplified in FIG. 8A, the BOF fusion processing stage 50 in the data fusion processing stage 40 and the discrepancy assessment stage 70 are coupled to the conflict arbitration stage 90.

In the embodiment considered, the conflict arbitration stage 90 includes a further a situation assessment stage 80, based on probabilistic models or alternatively based on encoded rules and logic formulas to resolve conflicting cell values in a fused map F by processing the set of detected discrepancies D. Therefore, the conflict arbitration stage 90 receives as input the fused map F from the BOF fusion processing stage 50 and the set of detected discrepancies D from the discrepancy detection stage 70.

In the embodiment as exemplified in FIGS. 8A and 8B, the situation assessment stage 80 comprises a conflict assessment stage 84 and a discrepancy-based relational modeling (briefly DBRM) stage 82. The occupancy grid processing stage 85 comprises a conflict detection stage 83, a conflict resolution stage 87 and a conflict correction stage 89.

The conflict detection stage 83 in the occupancy grid processing stage 85 receives the fused map F from the BOF processing stage 50 and provides at output said map F and/or a set CA of conflicting cells and/or a trigger signal.

Specifically, the conflict detection stage 83 performs operations of flagging a set of conflicting cells CA within grid cells $g_k^{ij}$ in the input fused map F, which may comprise, for instance:
- the grid cells of the fused map F having probability values $p(g_k^{ij} \approx 0.5)$ for a certain number of BOF data fusion 50 cycles,
- grid cells $g_k^{ij}$ being labeled as uncertain $p(g_k^{ij} \approx 0.5)$/unknown/conflicting over a certain time tk.

The conflict detection stage 83 may thus provide as output the set of flagged cells CA, signaling that a conflict has occurred. It is noted that within a fused grid F a plurality of flagged cells CA might be flagged at a time k. Thus, a same flag may be enabled per group of cells CA within the fused map F. Alternatively, multiple flag values may be associated to multiple grid cells at a same time k, e.g. to distinguish a higher "conflict level" from a lower one.

The trigger signal may be generated periodically, i.e. at given time instants, or as a function of probability values in the set of conflicting cells CA. The trigger signal and it may be used internally or provided to user processing stages 87, 84.

For example, the conflict detection stage 83 may receive multiple time frames of the fused map F from the BOF processing stage 50 in the data fusion processing 40 before applying flagging. The conflict detection stage 83 may wait for a certain time k, e.g. a certain number of fusion processing cycles, and/or wait for cells probability values to be stable before flagging said set of conflicting cells CA.

Alternatively, the presence itself of a non-null set of conflicting cells CA may be used as trigger signal.

In the embodiment considered, the conflict detection stage 83 provides said set of flagged cells CA and/or the fused map F and/or a trigger signal to the conflict assessment stage 84 in the situation assessment stage 80 and to the conflict resolution stage 87 in the occupancy grid map processing stage 85.

In the exemplary embodiment of FIGS. 8A and 8B, the conflict assessment stage 83 in the situation assessment stage receives as inputs:
the set of detected discrepancies D from the discrepancy assessment stage 70,
discrepancy-based relational models DM provided by a DBRM stage 82, e.g. stored in a memory 82,
the set of conflicting cells CA, and/or the fused map F, and/or the trigger signal.

The discrepancy-based relational models DM provided by stage 82 represent a set of rules to apply to the conflicting grid cells in the set of conflicting cells CA and/or the fused grid map F, to perform at least one of:
a spatial assessment, e.g. cell location, of conflicting cells,
an evaluation of probability of occupancy, e.g. via a discrepancy resolution logic.

The conflict assessment stage 84 is thus configured to use, e.g. combining, the set of detected discrepancies D and the discrepancy-based relational models DM, thus providing ways to solve the conflict which maintains "uncertain/unknown" the state of the grid cell.

More in detail, in order to obtain information to "tip" the occupancy of ambiguous cells towards either a first state, e.g. "occupied" $p(g_k^{ij} \gg 0.5)$, or a second state, e.g. "free" $p(g_k^{ij} \ll 0.5)$ state, the conflict assessment stage 84 may adopt a discrepancy resolution logic as discussed in the following.

A first exemplary resolution logic is developed via observation of the existence of discrepancy-based relations between different sensor measurements, similarly to the foregoing discussed with reference to FIG. 7.

In portions b), c) and d) of FIG. 7, the area A is a grid cell corresponding to the edge of the road, e.g. road lane. This information is confirmed by a visual sensor as a lane, and by (GPS/GIS) context map as a (round) boundary. However, a LiDAR sensor may likely classify the cell $p(g_k^A)$ of the resulting fused map as "free", because the majority of light beam energy is dispersed into the surrounding environment.

Therefore, as exemplified in FIG. 7, the discrepancies $D_{2i}$ and $D_{i1}$ in the set of detected discrepancies D, of visual sensor vs. LiDAR (portion c) and contextual map (GIS/GPS) vs. LiDAR (portion d), respectively, have a high discrepancy value as measurements from both sensor pairs contradict each other. On the contrary, the discrepancy $\Delta_{12}$ between visual sensor and GIS map (portion b) is very small, as measurements from both sensors confirm each other.

Obstacles detection is a concern, in particular, with respect to accurate determination of the presence of temporary jerseys which might occur on the road and/or lanes which determine road boundaries. These objects are likely sources of uncertainties as their presence/existence may generate/be in conflict within at least one pair of sensor reading.

The presence of said objects may be evaluated on the basis of detected discrepancies D by using the following logic/rules, for each cell:
if discrepancy $\Delta_{2i}$ and $\Delta_{12}$ indicate that sensor pairs $S_1$, $S_2$ and $S_i$, $S_2$ disagree, and $\Delta_{i1}$ indicates that sensor pair $S_i$, $S_1$ disagree, then the cell is labeled as "occupied",
if $\Delta_{2i}$ indicate that sensor pair $S_2$, $S_i$ disagree and $\Delta_{12}$ indicate that sensor pair $S_1$, $S_2$ agree and $\Delta_{i1}$ indicate that sensor pair $S_i$, $S_1$ agree, then the cell is labeled as "occupied",
in any other case, the cell is labelled as "free".

The "conflict" value, thus, is a parameter of discrepancy evaluation models DM provided by the discrepancy modeling stage 82. The "conflict" may be parametrized in models DM provided by stage 82. For example, "conflict"=0.5 may imply that grid cell $g_k^{ij}$ is labeled as free using data from a first sensor and occupied according to a grid map from second sensor reading, as discussed in the foregoing.

The conflict assessment stage 83 provides information about conflicting cells and types of conflicts, e.g. in a dataset CR, as an output of the situation assessment stage 80. Consequently, as exemplified in FIGS. 8A and 8B, the conflict resolution stage 87 in the occupancy grid processing stage 85 receives as input:
the dataset CR provided by the situation assessment stage 80, and
the set of values and locations of conflicting cells CA, and/or the fused map F and/or the trigger signal provided by the conflict detection stage 83.

The conflict resolution stage 87 processes inputs, for instance evaluating a probability of conflict as a spatial and temporal confidence in the sensor measurements. Thus, adaptive weight values W may be computed for further processing. For instance, weights values may comprise adaptive weights W, which may be passed "back" to previous stages, e.g. via a feedback network, to the data fusion processing stage 40, in particular in stage 520 of the BOF fusion stage 50, to apply to sensor grid values in the data fusion processing.

The conflict resolution stage 87 processes said inputs, providing a set of values CC.

In one or more embodiments, the set of values CC is indicative of a correction $\delta SF$ to apply to the fused map F in case of feed-forward corrections, or of a weight correction $\delta W$ in case the correction are applied in feed-back variant.

This would thus "tip", i.e. push or reassign, the probability of said conflicting cells to a defined state, e.g. either occupied or empty state. For instance, said resolved grid cells values may be computed as a function of the measure of the "conflict" values in the set of detected discrepancies D, e.g. by applying rules in the dataset CR provided by the situation assessment stage 80.

The output of the conflict resolution stage 87 is communicated to the conflict correction stage 89.

Consequently, the conflict correction stage 89 receives:
the set of values CC from the conflict correction stage 87,
the rules dataset CR,
the fused map F from the BOF fusion stage 50 in the data fusion processing stage 40.

The conflict correction stage 89 provides as output the drivable fused map M, which may be provided to a driver assistance system/interface IA as discussed in the foregoing.

Said fused grid map M, for instance, is obtained in the conflict correction stage 89 by merging and/or replacing values of conflicting grid cells in the fused map F with the corresponding values CC, e.g. resolved grid cells values.

Processing in a conflict correction stage 89 may be expressed as: M=F−δF, the difference between the fused map F and the correction δF from stage 87, or W=W̃−δW, the difference between a previously computed weight values set W̃ and the correction δW from stage 87, respectively in feed-forward or feed-back variant.

The fused grid map M thus facilitate accurately predicting and/or detecting the occupancy of an obstacle along the path of travel of the vehicle V, facilitating the online correction for the path of travel of the vehicle V by a drive assistance system/interface IA.

For instance, it may facilitate avoidance of a collision between the vehicle and the obstacle when the vehicle is operated by an autonomous driving system (not visible in the figures).

In an example as in FIG. 8B of sensor grid maps $G_1$, $G_2$, $G_i$ have, in order to provide a simplified example, n=2 lines and m=1 column of grid cells, whose processing in the discrepancy stage provides as a result the set of detected discrepancies D, where for instance:
- a first pair of sensors agree, e.g. $\Delta_{12}=0$,
- a second pair of sensors disagree, e.g. $\Delta_{2i}=1$,
- a third pair of sensors disagree, e.g. $\Delta_{i1}=1$.

The calculations shown here above represent of course a simple example, although in other embodiments different calculations to determine the discrepancies may be performed.

Processing the set of detected discrepancies in the conflict assessment stage 84 in combination with models DM, provide the dataset CR value, e.g. CR=⅔.

Moreover, again as an example, the conflict resolution stage 87 may receive the initial values of weight used in the fusion stage, e.g. $CA=\tilde{w}_0=\tilde{w}_1=\tilde{w}_2=\tilde{w}_i=\frac{1}{3}=0.33$.

Consequently, the conflict resolution stage 87 may compute the updated weight values, for instance to provide to the BOF fusion stage 50 in the grid fusion processing stage 40. For example, weights may be computed as follow: e.g.:

$$CC=[w_1, w_2, w_3]$$

where:
$w_1=w_2=u/u_1+u_2+u_i$;
$w_3=v/u_1+u_2u_3$
and
u=CA+CA*CC=0.55,
v=CA−CC=0.11.

Either in a feed-forward or a feed-back configuration, thus, the sensor grid maps probabilities of occupancy may be fused and weighted accordingly a function of these weights in the fused grid map M.

In a further variant embodiment of the arbitration stage 90, the value CC may comprise adaptive weights W to feed back to the BOF fusion processing 50 in the data fusion processing stage 40, e.g. in particular in the stage 520 of the BOF fusion processing, as visible in FIGS. 1, 5 and 8A-8B. This facilitates iterative weighting W, 520, 50 of sensor occupancy grid maps in the data fusion processing 50, e.g. providing a weighted Linear Opinion Pool fusion.

As already mentioned, in a variant embodiment as exemplified in FIG. 9, the DST fusion processing stage 60 in the data fusion processing stage 40 is coupled to the arbitration stage 90.

Specifically, in a variant embodiment as exemplified in FIG. 9, the arbitration stage 90' may comprise an evidential grid processing stage 85'.

As exemplified in FIG. 9, the evidential grid processing stage 85' comprises, similarly to what discussed in the foregoing, a detection stage 83' and a resolution stage 87'.

In a variant embodiment as exemplified in FIG. 9, when receiving a set FF of fused maps comprising also evidential grids E from DST processing 60, the detection stage 83' is be configured to pass said evidential grids E to the resolution stage 87', e.g. passing the values and triggering the activation of the stage 87' every time the stage 83' receives the evidential grids E.

In a variant embodiment as exemplified in FIG. 9, the conflict resolution stage 87' comprises, e.g. stores, Proportional Conflict Resolution (PCR) rules, which are suitable for use in connection with DST grid fusion 60.

In a variant embodiment as exemplified in FIG. 9, the decision "logic" about grid cell occupancy values (e.g. how to "tip" the probability of conflicting cells) may be based on a "belief function" Bel(X) having plural values, e.g. four values (masses)—(free, occupied, conflict, unknown), different from the binary Bayesian values free/occupied. Thus, DST facilitates to increase resolution of mapping thanks to the possibility to distribute the "belief" among four "states". In fact, this facilitates representing more in detail and in a more realistic way the transitions occurring in the environment and provide more reliable map of the environment.

In fact, even if GPS information states there is no wall, in case a LIDAR sensor states otherwise, it would be best to highlight this by assigning a "conflict" value, distinguishing from the case in which neither GPS nor LIDAR give information about a certain area, to be thus marked as "unknown". In the BOF fusion 50, in both cases of the previous example the grid cell of the fused map F would have been assigned a same probability value, e.g. of 0.5 and a same state, e.g. "unknown". On the other hand, DST enables to differentiate more "evidence" states, e.g. four states free, occupied, conflict, unknown.

Nevertheless, it has been observed that DST fusion 60 may produce counter-intuitive results when combining information from (highly) conflicting sources, thus PCR processing 87' may be used for the purpose of coping with an unpredictable "evidence" grid maps E, extending DST capability to automatically resolve potential conflicts.

For instance, one or more embodiments may comprise operations $87'_1$ of conflicting masses redistribution, e.g., proportionally to non-empty sets, according to all integrity constraints.

PCR stage 87' is for instance configured to compute the conjunctive combination of all sources n for all subsets (free, occupied, conflict, unknown)∈ A., generalizing the basic DST formula as:

$$m_\cap(A) = \sum_{X_1 \cap X_2 \cap \ldots \cap X_n = A} m_1(X_1) m_2(X_2) \ldots m_n(X_n)$$

The total conflicting mass can be expressed as follows:

$$K = \sum_{X_1 \cap X_2 \cap \ldots \cap X_n = conflict} m_1(X_1) m_2(X_2) \ldots m_n(X_n)$$

where:
the addendum $m(X_1 \cap X_2 \cap \ldots \cap X_n)$ in the above equation is the partial conflicting mass.

In one or more embodiments using evidential grids E, thus, each partial conflicting mass is redistributed 89' to its subsets in proportion to the basic probability mass already assigned to these subsets in the conflict resolution stage 87' of the arbitration stage 90', as exemplified in FIG. 9.

It is noted again that the variant embodiments of FIGS. 8A, 8B and 9 may be combined in a further variant embodiment, wherein the arbitration stage 90 may be coupled to BOF fusion processing and DST fusion 60.

In fact, the use of proportional conflict redistribution rules 87', briefly PCR, on evidential grid maps E and of conflict resolution via rules CR provided by situation assessment 80 of discrepancies D are not mutually exclusive approaches.

The two approaches may be combined in a variant embodiment, comprising, for instance in the arbitration stage 90:
multiple specialized parallel stages, each performing a specific function, e.g. a pair of conflict resolution stages 87,87';
a same stage performing both types of operations, e.g. a same processing stage 87 equipped to operate both on DST evidential grids E with PCR 87' and/or on BOF fused map F and rules dataset CR.

The latter arrangement may prove useful, e.g., if including both processing stages 50 and 60 in the processing data fusion stage 40. In fact, DST processing 60 and BF processing 50 may be performed, e.g. in parallel, in the data fusion stage 40 in order to improve consistency of the both methods and reduce each other weaknesses, e.g. to facilitate improved robustness.

The conflict arbitration stage 90 may thus facilitate coherent and reliable correction of conflicts in grid cells of at least one fused grid map F, E, thus outputting a drivable fused map M.

It will be appreciated that the representation of the processing stages discussed in the foregoing—in particular data fusion stage 40, BOF fusion 50, DST fusion 60, arbitration stage 90 and/or 90' and discrepancy detection stage 70—as distinct entities is merely for the sake of clarity and simplicity. In one or more embodiments, one or more of those stages may be integrated in the form of a multi-functional stage and/or circuit, e.g. in a single processor or DSP.

Figure 10:
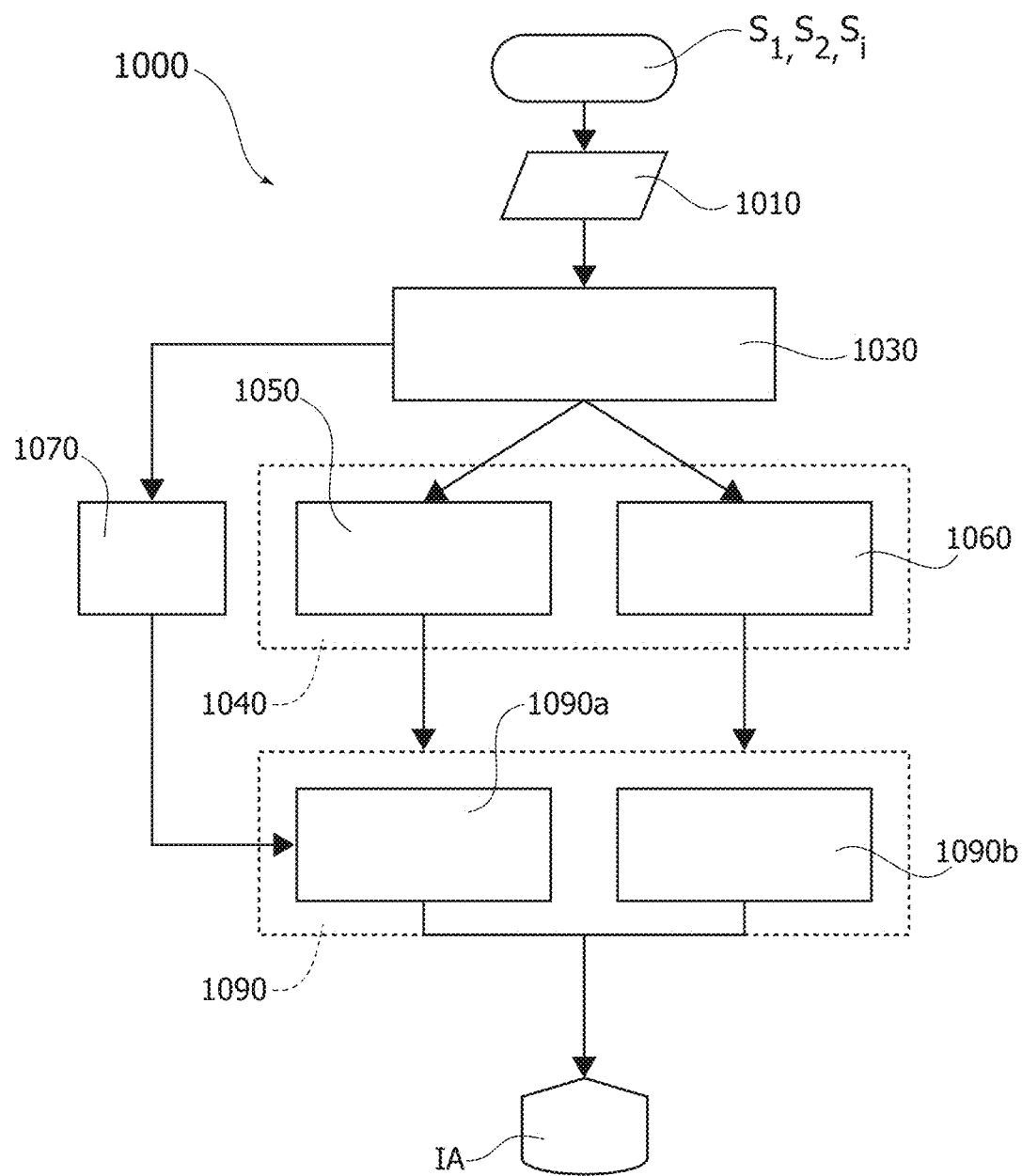
FIG. 10 is exemplary of embodiments of a method of vehicle environment mapping.

FIG. 10 is an exemplary diagram of a method 1000 of vehicle environment mapping according to embodiments described.

The method 1000 for mapping the environment of a vehicle V, e.g. a land vehicle, comprises the steps of:
starting the method operations, where $S_1$, $S_2$, $S_i$ indicates the presence of a plurality of sensors $S_1$, $S_2$, $S_i$, for example comprising a Lidar, a camera and a GPS/GIS;
performing an operation 1010 of receiving a set of input values $Y_1$, $Y_2$, $Y_i$ from a plurality of sensors $S_1$, $S_2$, $S_i$;
performing an operation 1030 of applying (decentralized) temporal fusion processing 30; 301, 302, 30i, to said set of input values $Y_1$, $Y_2$, $Y_i$, resulting in a respective set of occupancy grid maps $G_1$, $G_2$, $G_i$;
performing an operation 1040 of applying data fusion processing 40 to said set of occupancy grid maps $G_1$, $G_2$, $G_i$, resulting in a set FF of fused occupancy grid map F, E, for example using Bayesian Occupancy Filter processing, indicated with 1050, or Dempster-Shafer Theory of Evidence processing, indicated with 1060,
performing an operation 1070 of detecting discrepancies 70 by comparing of occupancy grid maps, for example 2-combinations of occupancy grid maps, in said set of maps $G_1$, $G_2$, $G_i$, resulting in a set of detected discrepancies D,
performing an operation 1090 of processing 1090 said set FF of fused occupancy grid map, outputting a set MM of fused occupancy grid map of drivable spaces, wherein the processing operation comprising performing an arbitration 1090a, 1090b of conflict in said at least one fused occupancy grid map F; E. The operation 1090a corresponds to the operation performed by the embodiment of the arbitration block 90 in FIGS. 8A and 8B, while operation 1090b corresponds to the operation performed by the embodiment of the arbitration block 90' in FIG. 9, as also detailed below;
performing an operation IA of providing the drivable arbitrated fused map M to at least one driver assistance device, the driver assistance device IA configured to operate as a function of said arbitrated fused occupancy grid map M of drivable spaces.

As described, the operation 1090 processing includes, in particular, at least one of:
feed-forward processing 1090a, 1090b,
feed-back processing 1090a, comprising adaptive weighting of sensor occupancy grid cells and/or sensor readings, for instance by providing adaptive weights W to the data fusion processing stage 40, e.g. to the stage 520 of BOF fusion 50.

As described, the operation 1090a feed-forward processing includes, in particular:
flagging, e.g. at block 83, a set of grid cells classified as uncertain over a certain period of time in the at least one fused map F or E, resulting in a set of flagged grid cells,
analyzing, e.g. in block 84, said set of detected discrepancies D, providing a set of compounding rules, e.g. models DM, as a function of stored models, which are store for instance in block 82.
applying, e.g. in block 87, the set of compounding rules, in particular adaptive weighting rules, to the values of said set of flagged grid cells in the at least one fused map F providing a set of values CC, e.g. compound/corrected grid cells values,
providing, e.g. in block 89 the compound fused occupancy grid map (M) of drivable spaces via incorporating said set of compound grid cells values in the flagged grid cells in the at least one fused map F.

As described, the operation 1090b processing includes, in particular:
passing, e.g. at block 83', a set of grid cells classified as uncertain over a certain period of time in the evidential grids E,
applying, e.g. in block 87', Proportional Conflict Redistribution of "masses" among evidential grids E, providing a set of compound grid cells values CC,
providing, e.g. in block 89' the compound fused occupancy grid map (M) of drivable spaces via incorporating said set of compound grid cells values in the flagged grid cells in the evidential grids E.

As already mentioned, the method can include either the using the blocks 50 and 90 for BOF or the blocks 60 and 90' for DST, e.g. performing either the operations 1050, 1090a and 1060, 1090b. However, in a further variant embodiment the data fusion block 40 can included both blocks 50 and 60, and the system 100 can include both the arbitration blocks 90, 90', this meaning that the method can include and perform all the operations shown in FIG. 10, e.g. operations 1040, 1050, 1070, 1090a and 1090b.

To sum up, one or more embodiments:

provide vehicle environment mapping, e.g. for a land vehicle, comprise temporal fusion and data fusion operations, for instance via Bayesian Occupancy Filter and/or Dempster-Shafer Theory of Evidence, temporal fusion processing may be performed locally in individual sensor, and individual sensor grid maps may be compared in groups of two to analyse discrepancies, the analysis of discrepancy and the outcome of data fusion are further processed via conflict arbitration processing, e.g. using Discrepancy-based Relational Models and/or Proportional Conflict Redistribution, the conflict arbitration may provide a compound fused grid map, e.g. with fresh values for the conflicting cells provided by arbitration processing, the compound fused grid map may be provided to a drive assistance system, e.g. onboard a vehicle equipped with a system to perform a method according to embodiments.

It will be otherwise understood that the various individual implementing options exemplified throughout the figures accompanying this description are not necessarily intended to be adopted in the same combinations exemplified in the figures. One or more embodiments may thus adopt these (otherwise non-mandatory) options individually and/or in different combinations with respect to the combination exemplified in the accompanying figures.

Without prejudice to the underlying principles, the details and embodiments may vary, even significantly, with respect to what has been described by way of example only, without departing from the extent of protection. The extent of protection is defined by the annexed claims. Thus, the invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A method for vehicle (V) environment mapping, comprising the steps of:

receiving a set of input values $(Y_1, Y_2, Y_i)$ from a plurality of sensors $(S_1, S_2, S_i)$, applying temporal fusion processing to said set of input values $(Y_1, Y_2, Y_i)$, resulting in a respective set of occupancy grid maps $(G_1, G_2, G_i)$, applying data fusion processing to said set of occupancy grid maps $(G_1, G_2, G_i)$ at least one of:

Bayesian Inference/Bayesian Occupancy Filter, resulting in a set of fused occupancy grid maps (FF), and processing said set of fused occupancy grid map (FF), said processing operation comprising performing an arbitration of conflict in said set of fused occupancy grid maps (FF) and outputting a set of arbitrated fused occupancy grid maps (MM), in particular an arbitrated fused occupancy grid map (M) of drivable spaces, wherein said processing said set of fused occupancy grid map (FF) further comprises:

flagging a set of grid cells (CA), preferably said set of grid cells (CA) comprising grid cells classified as uncertain, in said at least one fused map (F; E), applying said set of compounding rules (CR) to grid cells in said at least one fused map (F; E), providing a set of compound grid cells values (CC), providing said fused occupancy grid map of drivable spaces (M), comprising incorporating said set of compound grid cells values (CC) in the at least one fused map (F; E), wherein applying a data fusion processing to said set of sensors occupancy grid maps $(G_1, G_2, G_i)$ comprises a Bayesian Inference/Bayesian Occupancy Filter resulting in a fused occupancy grid map (F), and comprises detecting discrepancies by comparing occupancy grid maps in said set of maps $(G_1, G_2, G_i)$, resulting in a set of detected discrepancies $(D, \Delta_{12}, \Delta_{2i}, \Delta_{i1})$.

2. The method of claim 1, wherein applying a data fusion processing to said set of sensors occupancy grid maps $(G_1, G_2, G_i)$ further comprises a Dempster-Shafer Theory fusion processing stage, resulting in evidential fused grid maps (E).

3. The method of claim 1, wherein performing an arbitration of conflict in said set of fused occupancy grid maps (FF) includes the step of processing of said set of fused occupancy grid maps (FF), comprising:

providing a set of compounding rules (CR);

applying said compounding rules (CR) to at least one fused map (F; E) in said set of fused maps (FF).

4. The method of claim 3, wherein providing a set of compounding rules (CR) comprises applying Proportional Conflict Redistribution rules configured to be applied to evidential fused grid maps (E) received from DST fusion processing stage.

5. The method of claim 1, wherein providing a set of compounding rules (CR) comprises processing at least one of said set of detected discrepancies $(D, \Delta_{12}, \Delta_{2i}, \Delta_{i1})$, comprising analyzing (84) said set of detected discrepancies $(D, \Delta_{12}, \Delta_{2i}, \Delta_{i1})$ as a function of stored models (DM), preferably comprising Discrepancy Based Relational Models, briefly DBRM, configured to be applied to a fused occupancy grid map (F) received from BOF fusion processing stage.

6. The method of claim 5, wherein applying a data fusion processing to said set of sensors occupancy grid maps $(G_1, G_2, G_i)$ comprises both a Bayesian Inference/Bayesian Occupancy Filter fusion processing stage and a Dempster-Shafer Theory, fusion processing stage, and comprises:

said detecting discrepancies by comparing occupancy grid maps in said set of maps $(G_1, G_2, G_i)$, resulting in a set of detected discrepancies $(D, \Delta_{12}, \Delta_{2i}, \Delta_{i1})$, and said step of processing at least one of said set of detected discrepancies $(D, \Delta_{12}, \Delta_{2i}, \Delta_{i1})$, comprising analyzing said set of detected discrepancies $(D, \Delta_{12}, \Delta_{2i}, \Delta_{i1})$ as a function of stored models (DM) configured to be applied to a fused occupancy grid map (F) received from said BOF fusion processing stage.

7. The method claim 1, wherein performing an arbitration of conflict comprises a feed-back processing, preferably comprising adaptive weighting (W) of sensor occupancy grid cells and/or sensor readings by providing adaptive weights W to the data fusion processing stage (F).

8. The method of claim 1, wherein applying temporal fusion processing to said set of input values $(Y_1, Y_2, Y_i)$ comprises local decentralized processing of sensor readings in respective temporal fusion stages for each sensor $(S_1, S_2, S_i)$ in the plurality of sensor $(S_1, S_2, S_i)$.

9. The method of claim 1, wherein detecting discrepancies by comparing occupancy grid maps in said set of maps $(G_1, G_2, G_i)$ comprises assessing the conflicting grid cells locations and values $(D, \Delta_{12}, \Delta_{2i}, \Delta_{i1})$ among each 2-combination set in the set of 2-combination sets of said set of maps $(G_1, G_2, G_i)$.

10. The method of claim 1, wherein the method further comprises the step of providing said fused occupancy grid map (M) of drivable spaces to an interface (IA).

11. The method of claim 1, wherein the vehicle (V) is a land vehicle.

12. A system of environment mapping, comprising:
- at least one sensor ($S_1$, $S_2$, $S_i$), configured to collect at least one sensor reading ($Y_1$, $Y_2$, $Y_i$),
- processing circuitry, coupled to the at least one sensor ($S_1$, $S_2$, $S_i$) to receive said at least one sensor reading ($Y_1$, $Y_2$, $Y_i$),
- a drive assistance system interface (IA),
- wherein said processing circuitry is configured to provide at least one fused occupancy grid map of drivable spaces (M) to said drive assistance system interface (IA) with the method of claim 1.

13. The system of claim 12, wherein the plurality of sensors ($S_1$, $S_2$, $S_i$) comprises at least one of:
- a LIDAR,
- a GPS detector, providing context information, and
- a vision sensor.

14. A vehicle (V) equipped with a system as set forth in claim 12 in combination with at least one driver assistance device (IA), the driver assistance device (IA) configured to operate as a function of said fused occupancy grid map of drivable spaces (M).

15. A non-transitory computer-readable medium comprising instructions which, when the instructions are executed on at least one processing circuit, the instructions cause the at least one processing circuit to carry out the steps of the method of claim 1.

* * * * *